(12) United States Patent
Hellmann et al.

(10) Patent No.: US 6,697,570 B2
(45) Date of Patent: Feb. 24, 2004

(54) ROTARY ELECTRICAL HAND-TOOL DEVICE AND STARTUP SAFETY ROUTINE

(75) Inventors: Peter Hellmann, Obermeitingen (DE); Guido Werdun, Lüdenscheid (DE); Michael Reiner, Schwabmünchen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/055,661

(22) Filed: Jan. 23, 2002

(65) Prior Publication Data

US 2002/0110371 A1 Aug. 15, 2002

(30) Foreign Application Priority Data

Jan. 24, 2001 (DE) .......................................... 101 03 142

(51) Int. Cl.$^7$ ................................................ H02P 5/00
(52) U.S. Cl. ...................... 388/937; 388/935; 388/813; 388/800
(58) Field of Search ................................ 388/937, 935, 388/813, 800; 318/801, 812, 810, 434, 490, 569, 466, 257, 254, 139, 258, 256

(56) References Cited

U.S. PATENT DOCUMENTS

RE33,379 E * 10/1990 Bradus ........................ 388/812
6,025,683 A * 2/2000 Philipp ........................ 318/257

* cited by examiner

*Primary Examiner*—Robert Nappi
*Assistant Examiner*—Renata McCloud
(74) *Attorney, Agent, or Firm*—Sidley Austin Brown & Wood, LLP

(57) ABSTRACT

An electrical hand-tool device and start-up safety routine protecting against start-up blockages, in which an electrical motor is connected, for a short time span ($T_0$), with the current supply at a determinable resistance. At least one of a limit value ($\alpha_G$) and a shut-off point in time ($t_A$) is determined, for the safety routine in the event of tool blockage, using a measurement of the angle of rotation ($\phi$) of the rotor taken over the time span ($T_0$) dependent on the start-up behavior of a rotor in the time span ($T_0$).

8 Claims, 1 Drawing Sheet

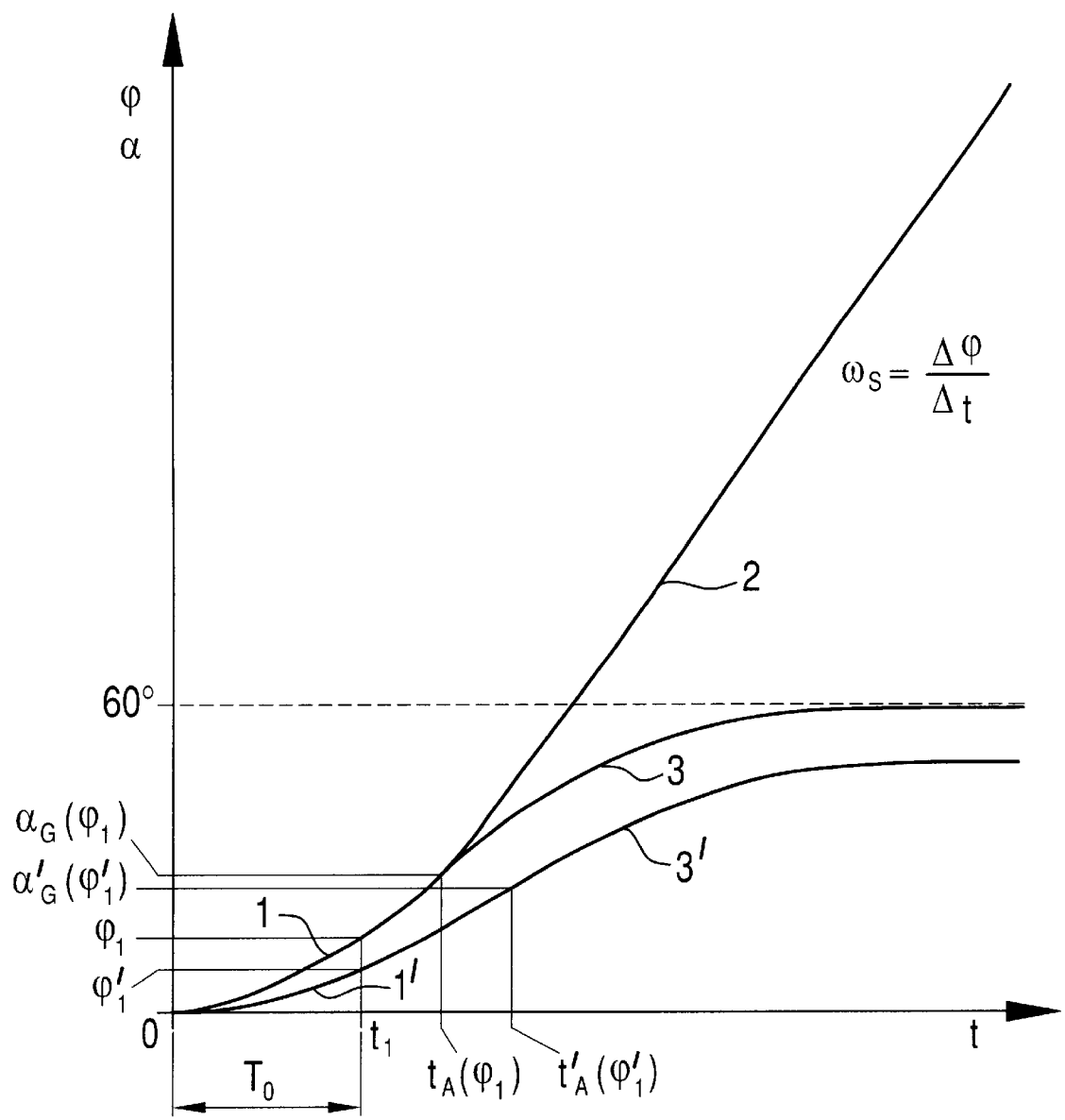

ROTARY ELECTRICAL HAND-TOOL DEVICE AND STARTUP SAFETY ROUTINE

BACKGROUND OF THE INVENTION

The invention relates to a startup safety routine and an associated rotary electrical hand-tool device, in particular a drilling machine, a hammer drill or a combination hammer. In large and powerful rotary electrical hand-tools, there is the danger of injury to the operator from the rotation of the housing due to stored kinetic energy resulting from sudden tool blockage. When starting the tool, there is a particularly significant risk of injury due to sudden deflection of the housing out of its stationary position as a result of startup blockage.

Usually, the sudden high angular momentum producing the blockage-induced rotation is cut-off from the blocked tool by a torque limiter or safety coupling or otherwise limited with respect to torque. The cut-off is frequently delayed, however, so that a deflection of the housing cannot be prevented from the rotational energy already transferred to the housing and considerable residual torque.

DE 3128410A1 discloses a method for measurement of the torque acting on the housing by the handle guiding the electrical hand-tool. The method includes using analog integration of a signal proportional to the torque to activate the safety device when the limit value is exceeded and thus, prevent tool blockage, jamming and twisting. The disadvantage with such a method is the requirement that the operator guides the electrical hand-tool to produce the counter-force.

EP 666148B1 discloses a process and a device for the prevention of high angles of rotation of electrical hand-tools, wherein a microcontroller, using the current angular acceleration of the housing, calculates the angle of rotation of the housing to be expected at some future time and, when a limiting value is exceeded, activates a safety device to prevent exceeding the value. In the case of blockage, upon starting, however, minor angular accelerations of the housing can occur. Particularly, when current-limited supply networks are used the advance-calculated angle of rotation of the housing does not exceed the limit value and, as a result, the safety device is not activated due to the initially slowly-building rotor acceleration of the electrical motor.

Such weak current networks occur when: the networks are generally weak; small conductor cross-sections limit the current flow; long extension lines are used; there are isolation transformers arranged in the power path or low-power generators supply the device. In power networks having 230 V/110 V, the start-up power of the performance electrical hand-tools considered in this invention are of the approximate magnitude of 30 A/60 A.

SUMMARY OF THE INVENTION

The object of this invention is to provide an improvement for the microcontroller-controlled safety routine that eliminates the above disadvantages and provides certain recognition of start-up blockages, in particular, when operating on a weak supply circuit, and to provide an associated electrical hand-tool device.

In accordance with the invention, there is generally provided a rotary electrical hand-tool comprising an electrical motor and a safety device, actuated by a microcontroller when a limit value is exceeded. Preferably the rotation of the housing is calculated in advance for the interruption of transmission of torque between a tool and the electrical motor.

Essentially, in an electrical hand-tool having a programmed microcontroller-regulated start-up safety routine, the electrical motor is supplied with the full effective voltage for an initial, brief period $T_0$ following the switch-on process. The rotor angular acceleration is calculated by the microcontroller by a measurement of the rotor angle of rotation $\phi$ over the period $T_0$. From the result, which is dependent on the internal resistance [i.e, source impedance] of the power supply circuit, at least one of the limit value $\alpha_G$ and the shut-off time $t_A$ is calculated and must be exceeded for triggering of the safety device by a rotation $\alpha$ of the housing, wherein the rotation $\alpha$ was calculated in advance. This adaptive adjustment, of the parameters of the start-up safety routine, is done using a representation readable by the microcontroller, at least using sample data dependent on the behavior upon starting of the rotor of the electrical motor in the period $T_0$.

Preferably, in the time span $T_0$, a possible phase angle control reducing the effective voltage is bypassed/bridged, whereby the electrical motor in the startup condition is definitively connected to the power supply network.

Preferably, should start-up blockage occur, the electrical hand-tool device results in only minimal rotations, for example <60°, of the housing which are possible as a result of the detected response behavior in the short period, $T_0$.

Advantageously, the triggering of the safety routine is reliable. In particular, since the start-up safety routine is designed to be adaptive, the rotations of the housing can be calculated in advance, in the event of start-up blockage, even beyond the specified voltage limits of the supply circuit specified in the standards. Moreover, a country-specific adjustment due to the different supply voltages is unnecessary because of the adaptive safety routine.

The start-up safety routine is implemented, preferably, without parameter changes beyond the limit values, in an existing safety routine that calculates the rotations in advance. The start-up safety routine can, therefore, be prioritized as a program by the microcontroller temporally before or higher than, or parallel to, the existing unmodified safety routine.

The rotary electrical hand-tool with the microcontroller-controlled safety routine is connected to means for determining the angle of rotation or speed. The microcontroller is connected to means for operation of the electrical motor, on the power supply circuit, using an effective impedance, at least in the temporal medium, that is advantageously zero or infinity.

It is advantageous if the resistance operated by the microcontroller is connected with an available phase angle control that reduces the effective voltage to the speed regulator, and further advantageous if the resistance is electrically bypassed.

The control dependent on the actual speed is advantageously fully modulated during the start period, which is substantially shorter than the run-up time to the desired speed.

BRIEF DESCRIPTION OF THE INVENTION

The invention is more fully explained below with reference to the drawing, in which:

FIG. 1 is a graphical representation of the principle of the process at various rotation values $\phi$ and $\alpha$ and times t.

DETAILED DESCRIPTION OF THE INVENTION

According to the illustration of FIG. 1, the electrical motor (not shown therein) of a rotary electrical hand-tool device at switch-on time t=0 and stationary rotor at a rotor angle of rotation of φ=0 is connected to the power supply circuit, whereby the rotor angle of rotation φ (1) corresponding to an initial curve segment 1 rises parabolically over the time t with its apex in the point of origin. During a short time period $T_0$, preferably 100 ms, following the switch-on time t=0, which is preferably part of the complete output level of the control and shorter than the run-up time at a nominal rotational velocity $\omega_S$, the electrical motor is connected with the full effective voltage of the power supply network and the rotor angle of rotation (p attains the value $\phi_1$ at time $t_1=T_0$. At a subsequent time $t>T_0$, a reduction of the effective voltage for a slowed startup behavior or regulation of the rated rotational velocity $\omega_S$ is achieved by an advantageously intervening phase angle control between the electrical motor and the power supply network, whereby after an inertially-induced flat transitional area, in the curve segment 2, the rotor angle of rotation φ(t) is shown as a constant rise over the time t. In the illustrated tool blockage case, the rotation α of the housing is proportional to the rotor angle of rotation φ and exceeds 60°.

For the detection of such a tool blockage, a microcontroller calculates, from the first curve segment 1 or the value φ, the rotor startup acceleration proportional to the current strength of the electrical motor, by double formation of the temporal derivation of φ(t) or by calculation of the square root of $\phi_1$. The limit value $\alpha_G$ is determined adaptively by the microcontroller from a microcontroller-readable representation of the rotor startup acceleration at an internal resistance of the power supply circuit, at least at a discrete sample data point. The safety routine calculates, in advance, the rotation α, at a point in time $t_A$, of the housing for the purpose triggering of the safety device. On exceeding a rotation α, also calculated in advance, the safety routine of a microcontroller—preferably the same microcontroller—cuts off the transmission of the torque and brakes the rotation such that the rotation does not exceed 60°, as illustrated by curve segment 3. In the case of weak current supplies with high internal resistance, an adaptive reduction of the limit value $\alpha'_G$ at a subsequent shut-off time $t'_A$, also calculated in advance, occurs and corresponds to the curve segment 1', 3'.

Instead of the direct connection of the electrical motor to the current supply, a known or measurable effective impedance, inclusive of zero, can be arranged between the electrical motor and the current supply. In the case of high-performance electrical hand-tool devices, means for determining the rotational speed are available; for example, magnetic rings and associated Hall sensors, which make measurement of the rotor angle of rotation φ(t) possible, at least discretely. The projection of the rotor start-up acceleration at the internal resistance of the current supply can also be done directly from the value of the rotor angle of rotation $\phi_1$ or from another intermediate value into the limit value to be determined. In all cases, the dynamic start-up behavior of the rotor of an electrical motor is used for the determination of the limit value.

Accordingly, the start-up safety routine has the following program sequence:

In an initial process step, the microcontroller connects the electrical motor to the current supply, for a short time period $T_0$, using a fixed effective impedance or an effective impedance, inclusive of zero, which is determined by the microcontroller;

In a second process step, the microcontroller, using means for the determination of the angle of rotation or the speed over the period $T_0$, measures the angle of rotation φ of the rotor;

In a further process step, the microcontroller calculates the angular acceleration of the rotor or a value dependent thereon;

In a final process step, the microcontroller ascertains at least one of the limit value and the shut-off point from the angular acceleration of the rotor or from a value dependent thereon using a projection readable by the microcontroller.

What is claimed is:

1. A process for a start-up safety routine of an electrical hand-tool that produces at least one direction of rotation and comprises an electrical motor and a safety device, wherein the safety device is actuated by a microcontroller upon exceeding a limit value ($\alpha_G$) and interrupts the transmission of the torque between a tool and the electrical motor; the process comprising the steps of connecting the electrical motor to the current supply, for a short time period ($T_0$), using one of a fixed impedance and a resistance determined by the microcontroller, wherein the impedance is zero and wherein the step of connecting includes the step of directly connecting the electrical motor to the power supply; measuring, via the microcontroller, the angle of rotation (φ(t)) of the rotor using measurement means that determine one of the angle of rotation (φ(t)) and the speed over the time period ($T_0$); calculating, via the microprocessor, one of the angular acceleration of the rotor and a value dependent on the angular acceleration of the rotor based on the measured angle of rotation (φ(t)) of the rotor and; ascertaining from one of the angular acceleration of the rotor and the value dependent on the angular acceleration of the rotor at least one of a limit value ($\alpha_G$) and a shut-off point in time ($t_A$) using a projection of a rotor start-up acceleration readable by the microcontroller.

2. The process of claim 1, further comprising a switch-on process for commencing the short time period ($T_0$).

3. The process of claim 1, further comprising the step of bridging a phase angle control using the impedance.

4. The process of claim 1, further comprising the step of doubly differentiating the angle of rotation (φ(t)) of the rotor for calculation purposes.

5. The process of claim 1, further comprising the step of determining the square root of an angle of rotation value ($\phi_1$) for calculation purposes.

6. An electrical hand-tool device protecting against start-up blockages comprising an electrical motor for the production of at least one rotational movement and a safety device actuated by a microcontroller in the event of overrun for interruption of the transmission of the torque between a tool and the electrical motor, wherein the microcontroller is connected to measurement means for the determination of one of the angle of rotation and speed and, wherein the microcontroller is connected to switching means for switching the electrical motor to the current supply using an impedance, wherein the impedance is zero.

7. The electrical hand-tool of claim 6, wherein the impedance switchable by the microcontroller is connected with a phase angle control for reducing the voltage.

8. The electrical hand-tool of claim 7, wherein the impedance switchable by the microcontroller is arranged parallel to a phase angle control for reducing the voltage.

* * * * *